United States Patent [19]

McMaster

[11] Patent Number: 4,609,391
[45] Date of Patent: Sep. 2, 1986

[54] METHOD FOR FORMING GLASS SHEETS

[75] Inventor: Harold A. McMaster, Woodville, Ohio

[73] Assignee: Glasstech, Inc., Perrysburg, Ohio

[21] Appl. No.: 779,873

[22] Filed: Sep. 25, 1985

Related U.S. Application Data

[62] Division of Ser. No. 674,039, Nov. 23, 1984, Pat. No. 4,575,390.

[51] Int. Cl.$^4$ ............................................. C03B 23/03
[52] U.S. Cl. ...................................... 65/104; 65/106; 65/107; 65/273
[58] Field of Search ................. 65/106, 107, 245, 253, 65/268, 104, 273

[56] References Cited

U.S. PATENT DOCUMENTS

| | | | |
|---|---|---|---|
| 3,457,060 | 7/1969 | Leflet, Jr. et al. | 65/107 |
| 4,204,854 | 5/1980 | McMaster | 65/106 |
| 4,229,200 | 10/1980 | Seymour | 65/106 |
| 4,356,018 | 10/1982 | McMaster | 65/106 |

Primary Examiner—Arthur Kellogg
Attorney, Agent, or Firm—Brooks & Kushman

[57] ABSTRACT

A method capable of accurately forming a heated glass sheet to a deep, abrupt, or complex curvature are disclosed as utilizing a first curved mold (42) that initially forms the glass sheet at a first forming station (20) preferably by the operation of gravity. The initially formed glass sheet is moved horizontally preferably by movement on the first curved mold (42) to a second forming station (22). A second curved mold (48) of the second forming station (22) engages the initially formed glass sheet to provide accurate forming preferably by downward movement of the second curved mold that provides the engagement thereof with the glass sheet. In the preferred construction disclosed, the heated glass sheet is transferred from a furnace conveyor (28) to a topside conveyor (32) for depositing onto the first curved mold (42), and a transfer conveyor (55) transfers the formed glass sheet from the second curved mold (48) to a quench station (24) for tempering.

17 Claims, 11 Drawing Figures

METHOD FOR FORMING GLASS SHEETS

This is a divisional of copending application Ser. No. 674,039 filed on Nov. 23, 1984, which issued on Mar. 11, 1986 as U.S. Pat. 4,575,390.

TECHNICAL FIELD

This invention relates to a method for forming glass sheets heated to a sufficiently high temperature to be deformable.

BACKGROUND ART

Many different types of systems and methods have previously been used to deform heated glass sheets from a flat shape to a curved shape. For example, vehicle windshields, side windows, and back windows are conventionally manufactured by heating flat glass sheets and then deforming the glass sheets to the desired curvature for the particular vehicle windshield or window involved. Also, presently there is an increasing use of curved architectural glass.

Different terminology has been utilized in the past to refer to deformation of flat glass sheets to a curved shape. The terms forming, bending, and shaping are all utilized to refer to such deformation of glass sheets whether the finally curved shape is relatively shallow and easy to perform, relatively deep or abrupt and harder to perform, or relatively complex and hard to perform even if not particularly abrupt or deep. Complex bends are glass shapes that have both concave and convex curvatures on each surface of the glass sheet and may also include deep and/or abrupt bends. Such complex bends are becoming increasingly difficult to manufacture with conventional forming methods and systems.

U.S. Pat. Nos. 4,282,026, 4,437,871, and 4,437,872 of Harold A. McMaster, Norman C. Nitschke, and John S. Nitschke disclose a system for bending heated flat glass sheets relatively quickly to a curved shape under the force of gravity. This system includes a holder having a downwardly facing surface that receives a heated glass sheet from a horizontal conveyor on which heating takes place. The holder then supports the heated glass sheet above the conveyor in preparation for bending. A curved bending mold of the system is positioned under the holder and has at least a substantial portion with a greater curvature than the holder surface. The mold then receives the heated glass sheet from the holder for bending under the force of gravity. One preferred embodiment of the system utilizes a planar holder surface such that only the curved mold must be changed when different sizes and/or shapes of glass sheets are to be bent. Another preferred embodiment disclosed for making relatively deep bends includes a curved holder surface against which the planar heated glass sheet received from the conveyor is pre-bent prior to gravity deformation below the curved holder on the curved mold which has a greater curvature than that of the curved holder surface.

U.S. Pat. No. 4,233,049 discloses another system for bending heated, flat glass sheets by releasing the glass sheets from a flat platen onto a curved bending mold for bending.

U.S. Pat. No. 4,260,408 discloses a glass sheet forming system wherein an initial bending operation and a subsequent press forming operation between a pair of opposed molds both take place at the same station.

U.S. Pat. No. 4,356,018 of Harold A. McMaster discloses a method and apparatus for deep bending glass sheets by initially releasing one portion thereof from a downwardly facing surface onto a curved bending mold while retaining another portion of the glass sheet against the downwardly facing surface by an upward flow of gas. Termination of the upward gas flow releases the other portion of the glass sheet in a manner that permits bending of the glass sheet to the curved shape of the mold without substantial sliding between the glass sheet and the mold.

Vehicle windshields are conventionally made by supporting a pair of glass sheets on a curved mold that is passed through an elongated furnace for slow sagging of the glass sheets to the mold shape. Thereafter, the curved glass sheets are laminated to each other by an intermediate layer of plastic in order to hold the glass in position upon breakage.

Most glass sheet bending and forming is performed with open center ring type molds or full surface molds. Open center ring type molds engage only the periphery of the glass sheet being deformed and thus prevent the possibility of any marking of the center glass area and resultant loss in optical quality. Full surface molds engage the center as well as the periphery of each glass sheet being deformed and thereby provide a more accurate control of the final shape of the center of the glass sheet.

DISCLOSURE OF INVENTION

An object of the present invention is to provide an improved method and improved apparatus capable of accurately forming a heated glass sheet even when relatively deep, abrupt, or complex curvature is involved.

In performing the method of the invention, a glass sheet is initially heated to a sufficiently high temperature to be deformable and is then engaged while at a first position with a first curved mold to provide initial forming of the glass sheet. The initially formed glass sheet is moved horizontally on the first curved mold to a second position and is then engaged at the second position with a second curved mold to further form the glass sheet. The initial forming at the first position and the subsequent forming at the second position provide accurate control of the final shape even when relatively deep, abrupt, or complex curvature is involved.

In the preferred practice of the method, the heated glass sheet is released from a downwardly facing surface above the first curved mold to provide the engagement that initially forms the glass sheet on the first curved mold by gravity. In one mode of operation, this downwardly facing surface supports the glass sheet in a spaced relation thereto without any surface to surface engagement between the glass sheet and the downwardly facing surface. In another mode of operation, the downwardly facing surface supports the glass sheet in an engaged relationship and is moved to transfer the glass sheet to the first curved mold. The forming on the first mold is also disclosed as taking place as portions of the first curved mold articulate with respect to each other in a manner that facilitates more difficult forming operations. Spot heating of the glass sheet to assist the forming is also utilized to make the glass sheet softer and easier to form in areas where the curved shape is difficult to form.

In the preferred practice of the method, the initially formed glass sheet is moved on the first curved mold from the first position to the second position below the second curved mold for the further forming.

At the second position, the second curved mold is preferably engaged with the initially formed glass sheet from above to provide the further forming of the glass sheet. Relative vertical movement between the first and second curved molds is provided to engage the glass sheet with the second curved mold at the second position. In accordance with one practice of the method, the second curved mold engaged with the initially formed glass sheet has the same curvature as the first curved mold such that the glass sheet can be pressed between the two curved molds to provide the further forming by the relative vertical movement between the curved molds. In another practice of the method, the second curved mold has a different curvature than the first curved mold and a differential gas pressure is applied at the second curved mold to provide the further forming to the shape thereof after the initial engagement therewith as provided by the relative vertical movement between the curved molds. In both modes of operation, the glass sheet is thereafter supported against a downwardly facing surface of the second curved mold by a differential gas pressure which may be provided by a vacuum applied at the surface. An upward gas flow can also be used to supply the differential gas pressure or assist the vacuum in supporting the glass sheet against the second curved mold.

After the engagement of the second curved mold with the initially formed glass sheet to provide the further forming, relative vertical movement between the first and second curved molds takes place to disengage the first curved mold from the glass sheet which is then supported by the second curved mold. A transfer mold of a transfer conveyor is then moved under the second curved mold and may be pressed against the second curved mold to form the glass sheet. The transfer mold is embodied by a ring that receives the glass sheet from the second curved mold. Thereafter, the transfer ring is moved away from the second curved mold with the glass sheet thereon for cooling of the glass sheet.

As disclosed, the formed glass sheet is rapidly cooled to provide tempering of the glass sheet as conventionally done with vehicle side and back windows. However, it is also possible to provide slower cooling of the formed glass sheet so as to be annealed in the manner utilized with vehicle windshields in the United States and many other countries.

In the preferred mode of operation, the relative vertical movement between the first and second curved molds is provided by moving the second curved mold vertically while the first curved mold remains stationary. It is also possible to provide the vertical movement between the first and second curved molds by moving the first curved mold vertically while the second curved mold either remains stationary or has an accompanying vertical movement in the opposite direction. However, movement of the second curved mold vertically is preferred since the first curved mold is moved horizontally between the first and second positions and it is much easier to provide movement of each mold in only one direction as opposed to two different directions. In providing the relative vertical movement by movement of the second curved mold, both downward and upward movements of the second curved mold are involved. Downward movement of the second curved mold provides the initial engagement thereof with the initially formed glass sheet on the first curved mold in order to permit the forming on the second curved mold. Subsequent upward vertical movement of the second curved mold disengages the glass sheet supported thereby from the first curved mold in preparation for the subsequent transferring previously described.

The improved apparatus of the invention is utilized to perform the method thereof by forming a glass sheet heated to a sufficiently high temperature to be deformable. This apparatus includes the first curved mold previously described in connection with the method for engaging the heated glass sheet to provide initial forming of the glass sheet on the first curved mold. The apparatus also includes means for moving the initially formed glass sheet horizontally to the second position from the first position where the first curved mold initially receives the glass sheet. The apparatus additionally includes the second curved mold that engages the initially formed glass sheet at the second position to further form the glass sheet.

As previously discussed in connection with the description of the method, the initial forming on the first curved mold and the subsequent forming on the second curved mold provides accurate control of the final glass shape even when relatively deep, abrupt, or complex curvatures are involved.

In its preferred construction, the apparatus includes a topside conveyor having a topside platen with a downwardly facing surface for supporting the heated glass sheet in a horizontally extending orientation and for releasing the heated glass sheet onto the first curved mold for initial forming by gravity. This topside platen in one embodiment supports the heated glass sheet in a spaced relationship thereto without any surface to surface engagement between the glass sheet and its downwardly facing surface. In another embodiment, the topside platen supports the heated glass sheet in an engaged relationship and includes an actuator that moves the platen to transfer the glass sheet to the first curved mold. A furnace having a roller conveyor for heating the glass sheet is also incorporated in the apparatus and supplies the heated glass sheet to the downwardly facing surface of the topside platen at the first position above the first curved mold on which the initial forming takes place.

The first curved mold is also disclosed as having portions that articulate with respect to each other as the glass sheet is initially formed in order to perform more difficult forming operations. Spot heaters of the apparatus make the glass softer and easier to form in areas where the curved shaped is difficult to form.

Preferably, the means of the apparatus for moving the glass sheet horizontally includes an actuator that moves the first curved mold between the first position where the glass sheet is received from the downwardly facing surface of the topside platen and the second position below the second curved mold. After the glass sheet is transferred from the first curved mold to the second curved mold, this actuator moves the first curved mold back to the first position in preparation for the next cycle.

The preferred construction of the apparatus also includes another actuator for providing relative vertical movement between the first and second curved molds at the second position to provide the engagement of the second curved mold with the initially formed glass sheet. This actuator preferably moves the second curved mold downwardly to provide the engagement thereof with the initially formed glass sheet and, thereafter, moves the second curved mold upwardly with the glass sheet supported thereon for movement out of engagement with the first curved mold.

A transfer conveyor of the apparatus includes a transfer mold that may be pressed against the second curved mold to form the glass sheet. The transfer mold is disclosed as being embodied by an open center transfer ring that receives the glass sheet from the second curved mold for movement away from the second curved mold. A further actuator provides the transfer ring movement in a horizontal direction from below the second curved mold to an adjacent position.

As disclosed, the apparatus also includes a quench station for tempering the formed glass sheet upon movement of the transfer ring by the actuator thereof from the second curved mold to between upper and lower blastheads of the quench station.

A vacuum is drawn at the downwardly facing surface of the topside platen and pressurized gas is supplied thereto in accordance with the one mode of operation previously mentioned to provide support of each glass sheet in a spaced relationship below the topside platen in preparation for being released onto the first curved mold when the vacuum is terminated. Likewise, a vacuum is drawn at the topside platen in accordance with the other mode of operation previously mentioned to initially support the glass sheet in an engaged relationship. A vacuum is also drawn at a downwardly facing surface of the second curved mold to provide the support of each glass sheet on the second mold after disengagement thereof with the first curved mold as a result of the vertical movement therebetween during the forming cycle. Both the initial and further forming preferably take place in a heated ambient. An upward gas flow supplied by a number of gas jet pumps can also be utilized in the heated ambient if necessary to assist in supporting the glass sheet below the topside platen and the second curved mold.

The objects, features, and advantages of the present invention are readily apparent from the following detailed description of the best modes for carrying out the invention when taken in connection with the accompanying drawings.

BEST MODES FOR CARRYING OUT THE INVENTION

Figure 1:
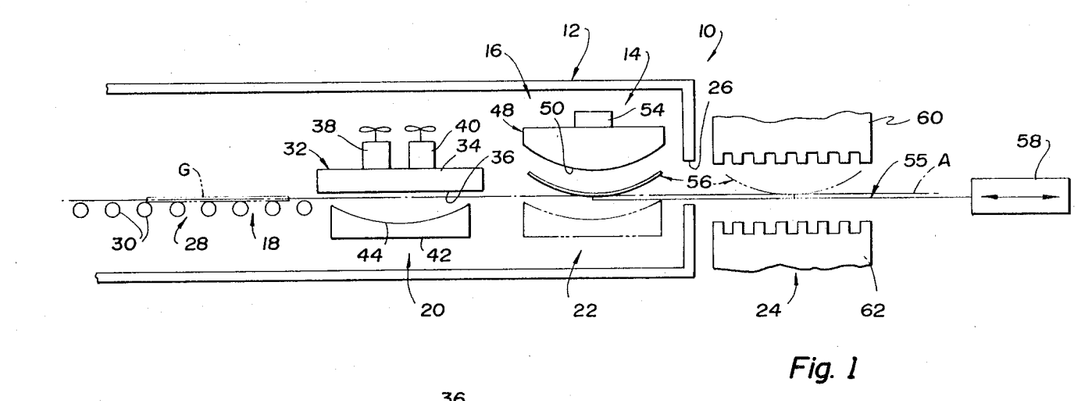
FIG. 1 is a side schematic view of a glass sheet forming system incorporating apparatus that is constructed in accordance with the invention and utilized to perform the glass sheet forming method thereof.

With reference to FIG. 1 of the drawings, one embodiment of a glass sheet forming system constructed in accordance with the present invention is generally indicated by 10 and includes a furnace 12 of an insulated construction that defines a heated chamber 14. Within the heated furnace chamber 14, apparatus 16 is located to provide glass sheet forming in accordance with the invention as is hereinafter more fully described. Both the apparatus 16 and the glass sheet forming method performed thereby constitute the invention and will be described together to facilitate an appreciation of the complete invention.

As illustrated in FIG. 1, glass sheet forming system 10 includes a heating section 18, a first forming station 20, a second forming station 22, and a quench station 24. The heating section 18, first forming station 20, and second forming station 22 are all illustrated located within the heated chamber 14 of the furnace 12 while the quench station 24 is located adjacent an access opening 26 through which formed glass sheets exit the furnace for rapid cooling at the quench station in order to provide tempering of the formed glass sheets. Locating both the first and second forming stations 20 and 22 within the heated chamber 14 is preferable in order to avoid heat loss and thereby eliminate the necessity of heating the glass sheets to a higher temperature so as to ultimately be hot enough to permit the tempering at the quench station 24.

Figure 2:
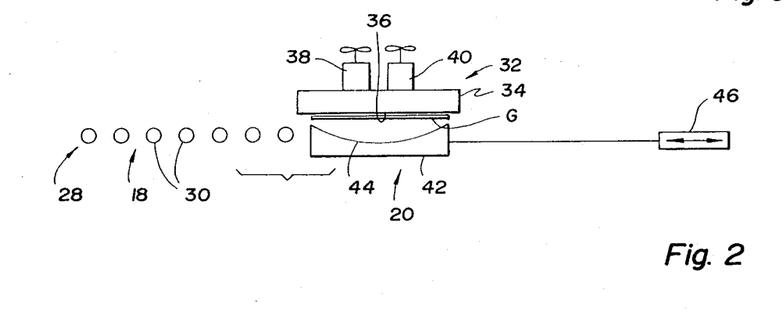
FIG. 2 is a partial view of the glass sheet forming system and illustrates a furnace conveyor on which glass sheets are heated, a topside conveyor which has received a heated glass sheet from the furnace conveyor, and a first curved mold illustrated at a first position adjacent the furnace conveyor.

With combined reference to FIGS. 1 and 2, the heating section 18 of the system includes a furnace conveyor 28 of the roller type including rolls 30 on which glass sheets are heated within the furnace 12 during conveyance at an elevation along a reference line A. A topside transfer conveyor 32 includes a topside platen 34 having a downwardly facing surface 36 of a flat shape located downstream from the roller conveyor 28. The topside platen 34 receives a heated glass G sheet as the glass sheet is conveyed from the roller conveyor 28 as shown in FIG. 1 to below the platen surface 36 as shown in FIG. 2. The glass sheet G is received by the topside platen 34 and supported in a spaced relationship just below its surface 36 by a vacuum and pressurized gas supplied by a pair of blowers 38 and 40 of the platen. Blower 38 draws a vacuum in a first array of spaced holes in the platen surface 36, while the blower 40 supplies pressurized gas to a second array of holes dispersed in the platen surface 36 between the first array of holes. The vacuum allows the ambient gas pressure below the glass sheet to provide the support thereof, while the pressurized gas spaces the glass sheet from the platen surface 36 to prevent surface to surface engagement. The inertia of the glass sheet as it is conveyed from the roller conveyor 28 and appropriate angling of the openings through which the pressurized gas is supplied provides conveyance of the glass sheet into engagement with suitable locators for properly positioning the glass sheet in a horizontally extending orientation in preparation for the forming operation.

Figure 3:
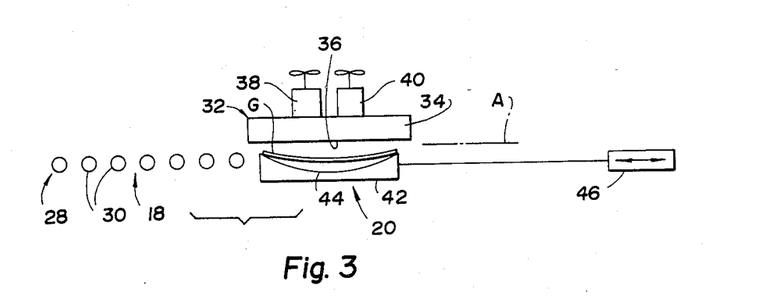
FIG. 3 is a partial view of the forming system similar to FIG. 2 but with the glass sheet released from the topside platen onto the first curved mold for initial forming of the glass sheet.

A first curved mold 42 of the forming station 20 has a curved portion 44 and is positioned in a first position at the forming station 20 as illustrated in FIG. 3 to receive the glass sheet from the platen 34 for gravity forming. The curved mold 42 may be either of a peripheral ring type having an open center or a continuous surface mold depending upon the particular glass sheet being formed. As illustrated, the curved portion 44 of mold 42 has a concave shape in an upwardly facing direction such that peripheral portions of the glass sheet initially engage the mold and the center of the glass sheet thereafter deforms downwardly under the impetus of gravity toward the shape of the mold to initially form the glass sheet.

Figure 4:
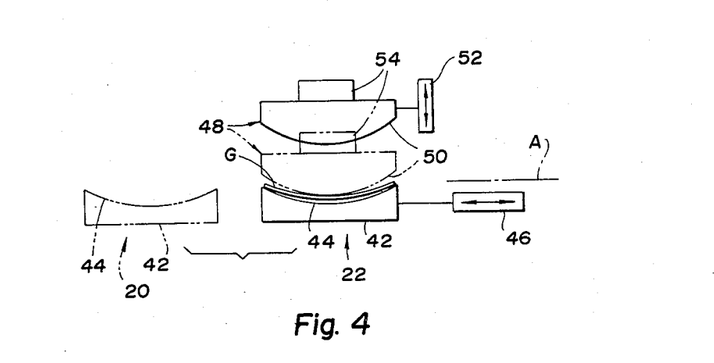
FIG. 4 is another partial view of the forming system and illustrates the first curved mold moved from its phantom line first position to the solid line second position below a second curved mold that is utilized to provide further forming of the initially formed glass sheet.

With combined reference to FIGS. 3 and 4, the first curved mold 42 includes an actuator 46 that provides a preferred means for moving the initially formed glass sheet from the first forming station 20 to a second position at the second forming station 22 by horizontal movement of this mold which carries the glass sheet. During this horizontal movement of the first curved mold 42, the force of gravity may continue to form the glass sheet in some cases while in others the glass sheet may be fully formed to the shape of this mold prior to movement from the first forming station 20. For some shapes such as illustrated in FIG. 4, the glass sheet may not be able to bend fully to the shape of the first curved mold 42 solely under the influence of gravity.

Figure 9:
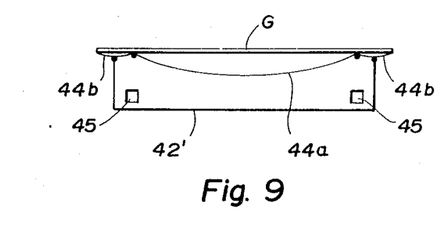
FIG. 9 is a view illustrating a second embodiment of the first mold which includes portions that are pivotally connected to each other and movable during the initial glass sheet forming.
Figure 10:
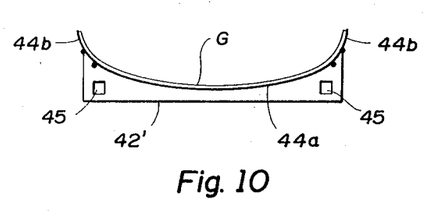
FIG. 10 is a view illustrating the second embodiment of the first mold after movement of the portions thereof as the glass sheet forms to the mold shape.

Another embodiment of the first curved mold 42' is illustrated in FIG. 9 and includes a main curved mold portion 44a as well as end curved mold portions 44b to which the main portion is pivotally connected in a hinged manner. The end mold portions are pivotally connected in a hinged manner to the mold support frame. The heated glass sheet G has a flat shape upon initially being received by the mold 42'. The glass sheet G forms to a curved shape as illustrated in FIG. 10 the main mold portion 44a and end mold portions 44b articulate with respect to each other about their pivotal connections under the force of gravity or other suitable actuation. Such mold articulation permits more difficult glass sheet forming to be performed than is otherwise possible. Also, spot heaters 45 may be utilized to provide localized heating that softens the glass sheet in areas that are more difficult to form and thereby facilitates the forming operation.

Figure 11:
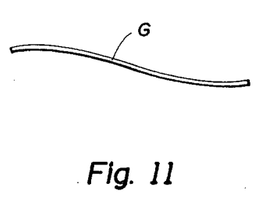
FIG. 11 is a sectional view through a glass sheet which has been formed to a complex shape.

It should be noted that while both of the first curved mold embodiments 42 and 42' are illustrated as initially forming the glass sheet to curvature in one direction, it is also possible for the initial forming to form the glass sheet of a complex curvature. Complex curvature of glass sheets as illustrated in FIG. 11 involves forming the glass sheet so as to have both concave and convex curvatures on each of its surfaces.

As illustrated in FIG. 4, the second forming station 22 includes a second curved mold 48 that is positioned above the elevation of the first curved mold 42 after movement of the latter mold to the second forming station in the manner previously described. The second curved mold 48 has a downwardly facing surface 50 which has a different curvature than the initially formed shape of the glass sheet. An actuator 52 provides relative vertical movement between the first and second curved molds 42 and 48 by moving the second curved mold 48 vertically. Initially, the actuator 52 moves the second curved mold 48 downwardly to the phantom line position illustrated to engage the curved surface 50 of the second curved mold with the initially formed glass sheet. As illustrated, the initially formed glass sheet is not fully formed to the curved shape 44 of the first mold 42 which has the same curvature as the curved surface 50 of the second mold 48. Continued downward movement of the second curved mold 48 under the operation of the actuator 52 provides a pressing action which accurately forms the glass sheet to the shape of these two molds.

The second curved mold 48 also includes a blower or a gas jet pump 54, such as of the type disclosed by U.S. Pat. No. 4,222,763, for drawing a vacuum through openings in the surface 50 to provide a differential gas pressure that secure the glass sheet to the second curved mold 48. This vacuum may also be applied to assist in the forming as the glass sheet is pressed between the molds. After the forming, upward movement of the second curved mold 48 lifts the glass sheet out of engagement with the first curved mold 42. The first curved mold 42 is then free to be moved horizontally back to the bending station 20 by the actuator 46 in preparation of the next cycle. The glass sheet remains supported on the downwardly facing curved surface 50 of the second curved mold 48 in preparation for subsequent transferring therefrom as is hereinafter more fully described.

Figure 5:
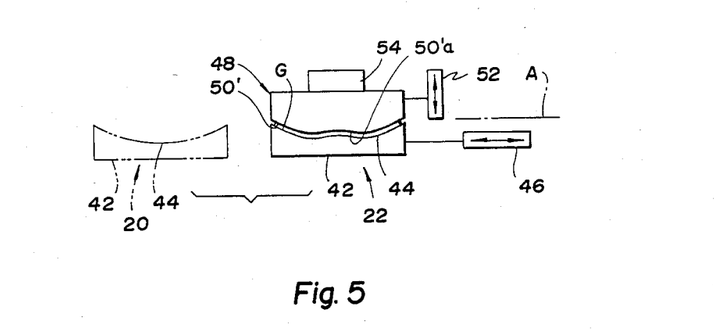
FIG. 5 is a view similar to FIG. 4 but illustrating another embodiment of the second curved mold which has a different curvature than the first curved mold unlike the embodiment of FIG. 4 wherein the two curved molds have the same curvature.

As illustrated in FIG. 5, another embodiment of the second curved mold 48 has a downwardly facing curved surface 50' which has a different curvature than the curved portion 44 of the first curved mold 42. In the particular embodiment illustrated, the curved surface 50' has a central formation 50'a of reverse curvature that defines a complex bend. The vacuum applied at the downwardly facing surface 50' by the gas jet pump 54 draws the glass sheet upwardly at the central formation 50'a to be formed to the complex shape of the second curved mold 58. Upward movement of the second curved mold 50' under the impetus of the actuator 52 then moves the glass sheet out of engagement with the first curved mold 42 which is then free to move back to the first forming station 20. As previously mentioned, the first curved mold 42 may also have a complex shape and may also cooperate with a second curved mold of complex shape like surface 50' to provide press forming in the manner previously described in connection with FIG. 4. In such cases, the complex shape of the first mold 42 normally requires that the mold be of the full surface type as opposed to a peripheral ring type that only engages the periphery of the glass sheet.

The initial differential gas pressure support of the glass sheet against the curved surface 50 illustrated in FIG. 4 or the initial support and forming against the curved surface 50' illustrated in FIG. 5 may also be provided by or assisted by upward gas flow from gas jet pumps located at the forming station 22 below the elevation of the first curved mold 42. Such assistance requires that the first curved mold 42 have a ring shape for engaging only the periphery of the glass sheet and an open center in order to permit the upward gas flow toward the curved surface of the second curved mold. After the glass sheet is initially supported, the vacuum drawn by the gas jet pump 54 may be reduced in order to prevent deformation of the glass sheet at the openings through which the vacuum is drawn at the curved surface.

Figure 6:
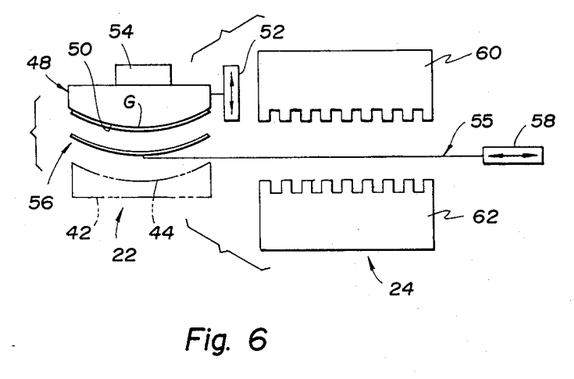
FIG. 6 is a further partial view of the forming system illustrating the second curved mold, a transfer conveyor for receiving the glass sheet from the second curved mold, and a quench station for tempering the formed glass sheet.

A transfer conveyor 55 of the apparatus is illustrated in FIG. 6 and includes an open center mold embodied by a ring 56. An actuator 58 of the transfer conveyor 55 provides horizontal movement thereof to below the second curved mold 48 with the glass sheet supported on its lower curved surface. The actuator 52 then moves the second curved mold 48 downwardly into proximity with the transfer ring 56 to release the glass sheet by termination of the vacuum drawn by the gas jet pump 54. It is also possible for the gas jet pump 54 to be reversed in order to supply pressurized gas to the mold surface 50 to force the glass sheet downwardly away from the second curved mold 48 onto the transfer ring 56 for movement away from the second curved mold. With some shapes, it may also be desirable to provide a pressing action between the second curved mold 48 and the transfer ring 56 to insure that the glass sheet is accurately formed prior to cooling to its final shape. A full surface transfer mold may also be used, as opposed to an open center ring, when the formed glass sheet is to be annealed instead of being tempered after the forming.

Figure 7:
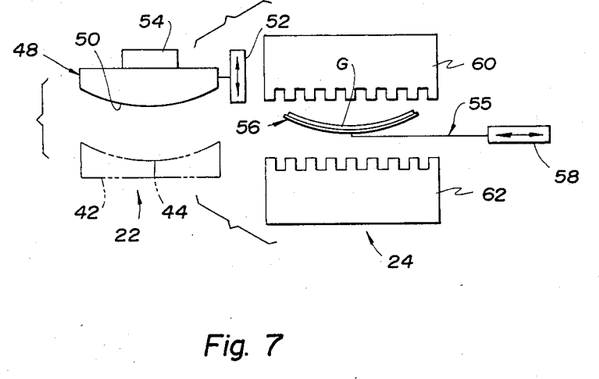
FIG. 7 is a view similar to FIG. 6 but illustrating a transfer ring of the transfer conveyor moved to the quench station with the formed glass sheet thereon to provide the tempering.

Actuator 58 of the transfer conveyor 55 is operated to move the ring 56 and the formed glass sheet thereon from the second forming station 22 as illustrated in FIG. 6 to the quench station 24 illustrated in FIG. 7. At the quench station 24, upper and lower blastheads 60 and 62 provide gas flow that rapidly cools the opposite surfaces of the formed glass sheet to provide tempering. The open center of the transfer ring 56 is necessary to permit the upward gas flow from the lower blasthead 62 to impinge with the lower surface of the formed glass sheet.

Figure 8:
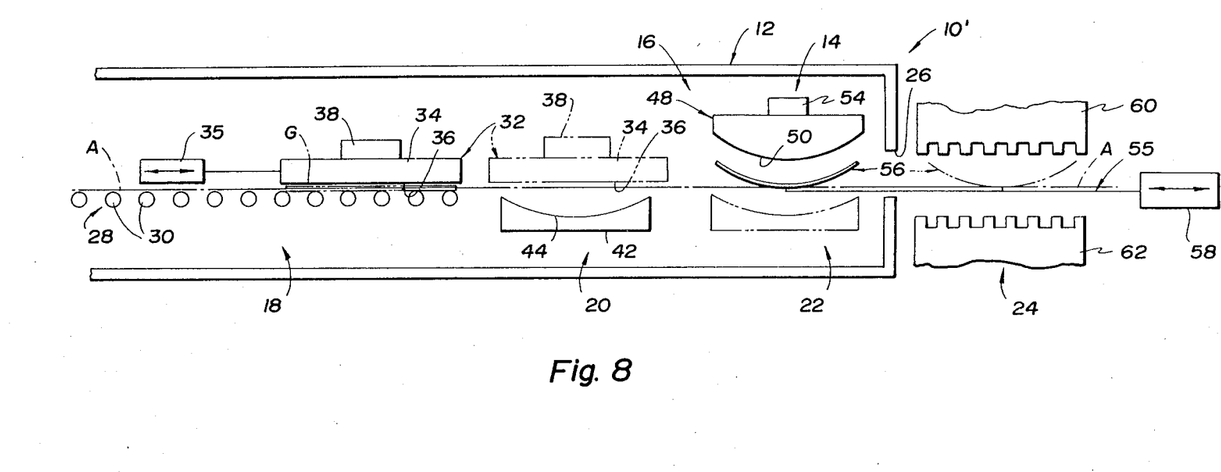
FIG. 8 is a view similar to FIG. 1 of another system incorporating apparatus constructed in accordance with the invention.

Another system 10' constructed in accordance with the present invention is illustrated in FIG. 8 and is similar to the previously described system except as will be noted such that like reference numerals are applied to like components thereof and much of the previous description is applicable and need not be repeated. System 10' includes a topside transfer conveyor 32 having a platen 34 that is moved by an actuator 35 between the solid and phantom line indicated positions illustrated to provide transferring of heated glass sheets from the rolls 30 of the heating conveyor to the bending station 20. Platen 34 has a downwardly facing surface 36 of a flat shape located just above the conveyor rolls 30. A vacuum is drawn at the surface 36, preferably by a gas jet pump 38 of the same type of the gas jet pump 54 associated with the second mold 48. A number of smaller gas jet pumps may also be utilized to provide an upward gas flow between the conveyor rolls 30 in order to assist the vacuum in lifting the glass sheet G from the conveyor up against the platen surface 36 in an engaged relationship. Gas jet pump 38 may be operated to decrease the extent of vacuum drawn after the initial lifting of the glass sheet upwardly from the conveyor such that there is no deformation of the heated glass sheet at openings in the surface 36 through which the vacuum is drawn. Also, when the glass sheet is ultimately released from the platen surface 36 for forming at the forming station 20, the vacuum drawn by the gas jet pump 38 is terminated and reverse operation thereof may also take place in order to supply a positive pressure to the openings in the surface 36 so as to thereby force the glass sheet downwardly away from the platen.

After a glass sheet is received by the conveyor platen 34 in the solid line indicated position of FIG. 8, the actuator 35 moves the platen to the phantom line indicated position whereupon the glass sheet is released in the manner described above onto the first curved mold 42 for the forming operation as previously described. Actuator 35 than moves the platen 34 back to the solid line indicated position in preparation for the next cycle as the first curved mold 42 is moved from the first forming station 20 to the second forming station 22.

It should also be noted, as previously mentioned, that in certain applications the forming apparatus of the invention may also be utilized to accurately form annealed glass such as is utilized in vehicle windshields without a final tempering operation of the type specifically herein described.

For a more complete understanding of the topside conveyor 32 illustrated in FIG. 1, reference should be made to the U.S. patent application Ser. No. 674,083 of Lee. E. Fackelman for Glass Sheet Processing System including Topside Transfer Apparatus which was filed concurrently herewith and issued on Mar. 25, 1986 as U.S. Pat. No. 4,578,103, the entire disclosure of which is hereby incorporated by reference.

For a more complete understanding of the topside conveyor 32 illustrated in FIG. 8, reference should be made to the U.S. patent application Ser. No. 590,770 filed on Mar. 19, 1984 in the name of Ronald A. McMaster for glass bending system including horizontally movable holder, issued on May 14, 1985 as U.S. Pat. No. 4,517,001, the entire disclosure of which is hereby incorporated by reference.

While the best modes for carrying out the invention have been described in detail, other ways of practicing the invention are readily apparent as described by the following claims.

What is claimed is:

1. A method for forming a glass sheet heated to a sufficiently high temperature to be deformable, the method comprising:
engaging the heated glass sheet at a first position with a first curved mold to provide initial forming of the glass sheet;
moving the initially formed glass sheet horizontally on the first curved mold to a second position; and
engaging the initially formed glass sheet at the second position with a second curved mold to further form the glass sheet.

2. The method of claim 1 wherein the heated glass sheet is released from a downwardly facing surface above the first curved mold to provide the engagement that initially forms the glass sheet on the first curved mold by gravity.

3. The method of claim 2 wherein the downwardly facing surface supports the glass sheet in a spaced relationship thereto without any surface to surface engagement between the glass sheet and the downwardly facing surface.

4. The method of claim 2 wherein the downwardly facing surface supports the glass sheet in an engaged relationship and is moved to transfer the glass sheet to the first curved mold.

5. The method of claim 1 wherein the glass sheet is formed on the first curved mold as portions thereof articulate with respect to each other.

6. The method of claim 1 wherein spot heating of the glass sheet is performed to assist the forming.

7. The method of claim 1 wherein the initially formed glass sheet is moved horizontally from the first position to the second position on the first curved mold to a location below the second curved mold.

8. The method of claim 1 wherein the second curved mold engages the initially formed glass sheet from above to provide the further forming of the glass sheet.

9. The method of claim 8 wherein relative vertical movement between the first and second curved molds provides the engagement of the glass sheet with the second curved molds.

10. The method of claim 9 wherein the second curved mold has the same curvature as the first curved mold in order to press form the glass sheet between the first and second curved molds by the relative vertical movement between the curved molds.

11. The method of claim 9 wherein the second curved mold has a different curvature than the first curved mold, and a differential gas pressure being applied at the second curved mold to form the glass sheet to the shape thereof after the initial engagement therewith as provided by the relative vertical movement between the curved molds.

12. The method of claim 9 wherein relative vertical movement between the first and second curved molds disengages the first curved mold from the glass sheet which is then supported by the second curved mold, and a transfer conveyor thereafter receiving and moving the glass sheet away from under the second curved mold for cooling of the glass sheet.

13. The method of claim 12 wherein the glass sheet is pressed between the second curved mold and a mold of the transfer conveyor.

14. The method of any preceding claim wherein the formed glass sheet is subsequently rapidly cooled to provide tempering of the glass sheet.

15. A method for forming a glass sheet heated to a sufficiently high temperature to be deformable, the method comprising:
 releasing the heated glass sheet while in a horizontally extending orientation from a downwardly facing surface at a first position onto a first curved mold to initially gravity form the glass sheet on the first curved mold;
 moving the first curved mold with the glass sheet thereon horizontally to a second position; and
 engaging the initially formed glass sheet from above at the second position with a second curved mold to further form the glass sheet.

16. A method for forming a glass sheet heated to a sufficiently high temperature to be deformable, the method comprising:
 releasing the heated glass sheet while in a horizontally extending orientation from a downwardly facing surface at a fist position onto a first curved mold to initially gravity form the glass sheet on the first curved mold;
 moving the first curved mold with the glass sheet thereon horizontally to a second position below a second curved mold of a different curvature than the initially formed glass sheet;
 providing relative vertical movement between the first and second curved molds to engage the initially formed glass sheet with the second curved mold for further forming of the glass sheet;
 providing relative vertical movement between the first and second curved molds to disengage the first curved mold from the glass sheet as the glass sheet remains supported by the second curved mold; and
 transferring the glass sheet from the second curved mold to a transfer conveyor for movement away from the second curved mold.

17. A method for forming a glass sheet heated to a sufficiently high temperature to be deformable, the method comprising:
 supporting the heated glass sheet in a horizontally extending orientation below a downwardly facing planar surface;
 releasing the glass sheet from the downwardly facing surface at a first position onto a first curved mold to initially form the glass sheet by gravity on the first curved mold;
 moving the first curved mold with the glass sheet thereon horizontally to a second position below a second curved mold of a different curvature than the initially formed glass sheet;
 moving the second curved mold downwardly to provide engagement thereof with the initially formed glass sheet to further form the glass sheet;
 moving the second curved mold upwardly with the glass sheet supported thereby so as to be moved out of engagement with the first curved mold;
 transferring the glass sheet from the second curved mold to an open center transfer ring for movement away from the second curved mold; and
 moving the transfer ring to a quench station to temper the formed glass sheet.

* * * * *

UNITED STATES PATENT AND TRADEMARK OFFICE
CERTIFICATE OF CORRECTION

PATENT NO. : 4,609,391
DATED : September 2, 1986
INVENTOR(S) : Harold A. McMaster It is certified that error appears in the above-identified patent and that said Letters Patent is hereby corrected as shown below:

Column 7, line 67, after "sheet", "of" should read -- to --.

Column 8, line 52, "58" should read -- 48 --.

Column 9, line 59, after "type", "of" should read -- as --.

Column 11, line 19, claim 9, "molds" should read -- mold --.

Column 12, line 11, claim 16, "fist" should read -- first --.

Signed and Sealed this

Eighth Day of December, 1987

Attest:

DONALD J. QUIGG

*Attesting Officer*  *Commissioner of Patents and Trademarks*